Oct. 7, 1969  E. L. PARR  3,471,185
HELICAL RATCHET CLASP
Filed Dec. 29, 1967

INVENTOR.
EDWARD L. PARR
BY
*Warren H. F. Schmieding*
ATTORNEY

United States Patent Office 3,471,185
Patented Oct. 7, 1969

3,471,185
HELICAL RATCHET CLASP
Edward L. Parr, El Cajon, Calif., assignor to
Wendell L. Thompson, Burbank, Calif.
Filed Dec. 29, 1967, Ser. No. 694,541
Int. Cl. F16b 7/10
U.S. Cl. 287—61                                    4 Claims

ABSTRACT OF THE DISCLOSURE

A clasp which can also function as a turnbuckle includes two elongated telescoping and relatively rotatable elements, one of which, preferably the element which is received by the other, is threaded, and the other element is provided with a lever actuated pawl, which pawl can be moved into and out of clasping relationship with the various surfaces of one of a face of the thread.

BACKGROUND OF THE INVENTION

Field of the invention

The subject matter apparatus to clasp or buckles of the type which can be adjusted longitudinally.

SUMMARY OF THE INVENTION

The clasp of the present invention includes a tubular element which receives another elongated element. One of the elements is threaded and the other element carries a pawl which can be moved into and out of the interdental spaces between the crowns of the thread for clasping with and releasing the elements from one another. Preferably, as herein shown, the received element is provided with an external thread and the tubular element carries a lever which includes the pawl.

Other features and the advantages of the present invention will be apparent from the following description, reference being had to the accompanying drawings wherein a preferred embodiment of the invention is illustrated.

DESCRIPTION OF THE PREFERRED EMBODIMENT

The clasp 20 includes two main elements which can be brought into and out of telescopic relationship with one another, and which can be rotated relative to one another. One of these elements, preferably the received element 22 is threaded as at 24, and the other element or frame is in the form of a tube 26. A pawl 28 is movably carried by the tube 26 and is adapted to be moved into and out of clasping relationship with the helical surfaces of a face of the thread.

Figure 4:
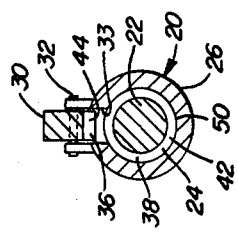
FIG. 4 is a sectional view taken along line 4—4 of FIG. 3.
Figure 1:
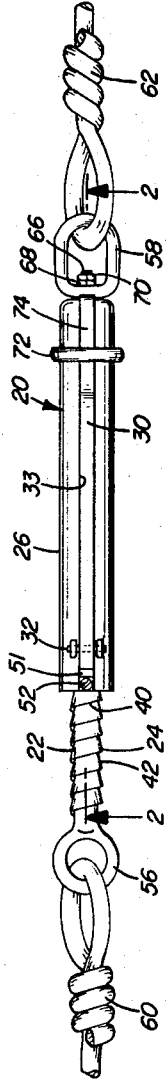
FIG. 1 is a side view of the clasp.
Figure 3:
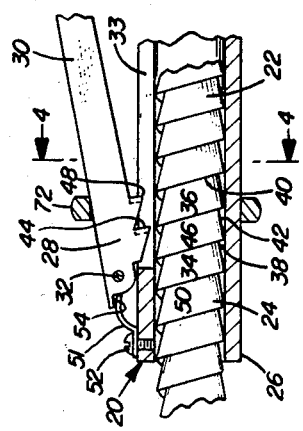
FIG. 3 is a view of a fragment of the clasp shown in FIG. 2, but showing the pawl removed from clasping relationship with the thread.
Figure 2:
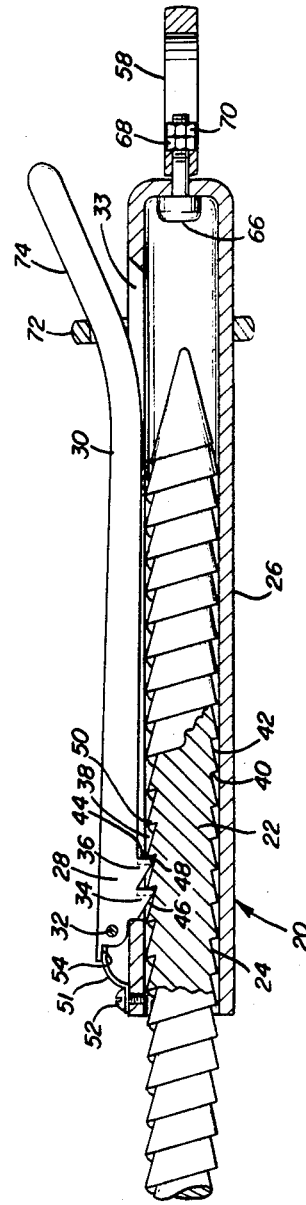
FIG. 2 is a sectional view taken along line 2—2 of FIG. 1, but on a larger scale and showing the lever and pawl in elevation, and also showing part of the threaded element in section and showing the pawl and thread in clasping relationship.

The pawl is formed integrally with a lever 30 which latter is pivotally carried by a pin 32 on the tube 26. The lever and pawl are received in a longitudinally extending slot 33 in the tube. The pawl includes two teeth 34 and 36, which are adapted to be moved simultaneously into and out of the interdental spaces 38 between any of the next adjacent crowns of the thread 24. FIG. 2 shows the pawl teeth 34 and 36 in clasping position, and FIG. 3 shows the teeth removed from clasping position.

It will be observed that the surfaces of the forward face 40 of the thread 24 is less acute with respect to the axis of the thread than the trailing surfaces of the face 42. It will be observed further that the angle of the faces 44 of the teeth 34 and 36 of the pawl 28 complement the angle of the forward surface of the face 40 when the pawl and thread are in clasping position. The angle of the forward surfaces of the face 40 is approximately ninety degrees with respect to the axis of the thread, thereby assuring positive clasping when in the position shown in FIG. 2.

It will also be observed that the obverse faces 46 of the pawl teeth 34 and 36 are at a more acute angle with respect to the axis of thread than the clasping faces 42, herein shown, at approximately twenty-five degrees. Therefore, due to the angles of the trailing face 42 of the thread and the angle of the obverse faces 46 of the pawl, the receiving element 22 can be pushed into the tube 26 although the apices 48 of the teeth 34 and 36 of the pawl rest on the crowns 50 of the thread.

When it is desired to connect the two elements 22 and 26, the threaded element 22 is inserted into the tube 26 to the desired distance. The lever 30, carrying the pawl 28, is pushed farther into the slot 33, whereby the faces 44 of the pawl teeth 34 and 36 are brought into clasping position with two of the forward surfaces of face 40 of the thread 24. Preferably, the lever and pawl are forced yieldingly into clasping position by a spring 51 having one end fixed to the tube 26 by a screw 52 and the other end extending into a notch 54 in the lever. The threaded element 22 can be released from clasping position from tube 26 by merely pulling the lever outwardly. The element 22 can then be pulled out of the tube.

The outer end of the threaded element 22 is provided with an integral ring 56 and the closed end of the tube 26 carries a ring 58. These rings may be connected, respectively, to cables, ropes, or chains, shown here, as ropes at 60 and 62. Thus, these ropes can be readily connected and disconnected.

The clasp 20 can also function as a turnbuckle after the elements are in clasping relationship. Either of the elements may be rotated relative to the other, and, when rotated properly, the inward telescoping action is increased to pull the ropes toward one another.

Either of the elements 22 or 26 may have a rotatable coupling attached to it. Here the coupling is shown as the ring 58, which is rotatably connected with the tubular element 26 by a bolt 66 and a nut 68 and a lock nut 70.

A keeper in the form of a locking ring 72 surrounds the tubular element and the lever 30. The opening in the ring is of sufficient width to permit disengagement of the teeth 34 and 36 from the thread 24 of element 22 when the ring is in the forward position, as shown in FIG. 7. However, the rear portion 74 of the lever 30 angles rearwardly and upwardly whereby when the ring 72 is moved rearwardly to the position shown in FIG. 2, the teeth 34 and 36 of the pawl are latched with the thread 24.

From the foregoing, it is readily apparent that by virtue of the present invention there has been provided a readily attachable and detachable clasp which also functions as a turnbuckle. It is simple in construction and can be manufactured at a low cost.

I claim:
1. A combination clasp and turnbuckle comprising:
   (A) an elongated element forming an elongated frame, one end thereof being open for receiving a second elongated element;
   (B) second elongated element having an externally spirally threaded portion slidably extending into the frame through said open end and having a portion extending outwardly through said open end;
   (C) fastening means carried at the end of the frame opposite the said one end;

(D) fastening means carried at the outer end of the second mentioned element;

(E) means for rotatably fastening one of the fastening means to the element carrying the same;

(F) a pawl having a tooth movable into and out of the interdental spaces between the spiral crown of the thread on said second mentioned element, and having a manipulatable portion thereof exterior of the frame;

(G) means for pivotally supporting the pawl by the frame.

2. A combination clasp and turnbuckle as defined in claim 1, characterized to include:

(H) a handle formed integrally with the pawl and extending along and toward said opposite end of the frame;

(I) a keeper slidable along the frame and handle and embracing the handle and frame.

3. A combination clasp and turnbuckle as defined in claim 11, characterized in that the frame is in the form of a tube.

4. A combination clasp and turnbuckle as defined in claim 1, characterized in that the frame is provided with a slot adjacent said open end thereof and that the pawl extends through the slot.

References Cited
UNITED STATES PATENTS

| | | |
|---|---|---|
| 971,375 | 9/1910 | Hays. |
| 1,234,606 | 7/1917 | Benedict. |
| 1,393,614 | 10/1921 | Ferragamo _____ 287—61 |
| 1,627,776 | 5/1927 | Haumerson. |
| 1,913,261 | 6/1933 | Brockman. |
| 3,267,545 | 8/1966 | Eckart. |

BERNARD A. GELAK, Primary Examiner

U.S. Cl. X.R.

24—206

PO-1050
(5/69)

UNITED STATES PATENT OFFICE
CERTIFICATE OF CORRECTION

Patent No. 3,471,185            Dated October 7, 1969

Inventor(s) Edward L. Parr

It is certified that error appears in the above-identified patent and that said Letters Patent are hereby corrected as shown below:

Column 1, line 24          "apparatus" should be --appertains--

Column 4, line 1           "11" should be --1--

SIGNED AND
SEALED
JAN 6 - 1970

(SEAL)
Attest:

Edward M. Fletcher, Jr.          WILLIAM E. SCHUYLER, JR.
Attesting Officer               Commissioner of Patents